United States Patent Office 2,989,573
Patented June 20, 1961

---

2,989,573
CATALYTIC POLYMERIZATION OF DIOLEFINS USING PENTABORANE
David M. Gardner, Abington, Pa., assignor to Thiokol Chemical Corporation, Trenton, N.J., a corporation of Delaware
No Drawing. Filed July 16, 1958, Ser. No. 748,797
2 Claims. (Cl. 260—680)

This invention relates to a method for the manufacture of liquid polymers of lower olefin hydrocarbons, such as 1,3-butadiene, isoprene, ethylene, propylene, isobutylene and the like. Liquid polymers of such olefins are well known materials which have many uses. Thus, liquid polymers of 1,3-butadiene are useful additives to drying oils, particularly semi-drying oils such as soya bean oil, cottonseed oil, and the like, for the purpose of improving the bodying and drying characteristics of the oils. Liquid polymers of 1,3-butadiene are also useful as tackifiers and/or plasticizers for synthetic rubber and for natural rubber.

In accordance with this invention, the liquid polymers are manufactured by heating the olefin hydrocarbons in vapor phase in admixture with a boron hydride such as pentaborane-9. The temperature employed in carrying out the polymerization will generally be within the range from 175° C. to 250° C., although somewhat higher and somewhat lower temperatures can also be used, if desired. The amount of boron hydride present in the reaction mixture will generally be within the range from 0.1 to 10 moles per 100 moles of the olefin hydrocarbon.

The following example illustrates the invention.

*Example 1*

This experiment is conducted in a cyclic flow system which consists of a bellows gas pump, a product receiver trap, and a heated reactor tube which contains the catalyst. A manometer is connected to the system in order to measure its pressure. The reaction is carried out in the gas phase and the circulation of the reactant mixture through all components of the apparatus is continuous. The reactor consists of a jacketed Pyrex glass tube which is one inch in inside diameter and which is placed in a resistance type electric furnace. A thermometer extends into the reactor to measure the reaction temperature. The system is first evacuated and then 100 milligrams of pentaborane-9 is introduced into the system. At this point, the absolute pressure within the system is 18.1 millimeters of mercury at 25° C. 1,3-butadiene is then introduced into the system until the absolute pressure within the system is one atmosphere. Thus, the amount of 1,3-butadiene introduced is approximately 65 millimoles. The bellows pump is then started and the reaction tube is slowly heated from room temperature to 180° C. while the gases are being circulated. Heating is continued to 188–190° C. and a liquid is observed to be forming in the product receiver traps. During the reaction, the pressure within the system is maintained at atmospheric pressure by the introduction of small amounts of 1,3-butadiene. After about 45 minutes of heating, the furnace is turned off, the apparatus is permitted to cool, and the colorless liquid (70.4 milligrams) is removed. Analysis shows that the liquid is essentially a polymer of 1,3-butadiene.

I claim:
1. A method for the preparation of a liquid polymer of a conjugated diene hydrocarbon having 4 to 5 carbon atoms which comprises heating a gaseous conjugated diene hydrocarbon in the presence of a catalyst consisting essentially of pentaborane-9 at a temperature within the range from 175° C. to 250° C. and recovering a liquid polymer of the conjugated diene hydrocarbon from the reaction mixture, the molar ratio of pentaborane-9 to conjugated diene hydrocarbon present in the reaction mixture being within the range from 0.1:100 to 10:100.
2. The method of claim 1 wherein said conjugated diene hydrocarbon is 1,3-butadiene.

References Cited in the file of this patent
UNITED STATES PATENTS

| | | |
|---|---|---|
| 2,717,889 | Feller et al. | Sept. 15, 1955 |
| 2,773,053 | Field et al. | Dec. 4, 1956 |
| 2,840,551 | Field et al. | June 24, 1958 |
| 2,892,826 | Peters et al. | June 30, 1959 |
| 2,898,326 | Peters et al. | Aug. 4, 1959 |

OTHER REFERENCES

"Chemistry of the Hydrides," D. T. Hurd, John Wiley and Sons, New York, 1952, page 94.